Patented Jan. 7, 1941

2,227,900

UNITED STATES PATENT OFFICE 2,227,900

MANUFACTURE OF RUBBER ARTICLES

Bernard James Habgood and Leslie Budworth Morgan, Blackley, Manchester, England, assignors to Imperial Chemical Industries Limited, a corporation of Great Britain No Drawing. Application February 9, 1937, Serial No. 124,926. In Great Britain February 11, 1936

12 Claims. (Cl. 154—2)

This invention relates to the manufacture of composite rubber articles comprising vulcanised natural rubber bonded to vulcanised synthetic rubber-like material made by interpolymerising a mixture of butadiene and/or its homologues with certain other polymerisable substances, namely polymerisable nitriles, ketones and esters derived from acrylic acid and having the following formulae:

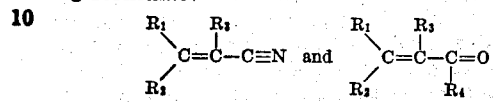

in which $R_1$, $R_2$ and $R_3$ stand for hydrogen or alkyl, and $R_4$ stands for alkyl or alkoxy.

The above synthetic rubber-like materials, especially the ones in which a relatively high proportion of the acrylic acid derivatives has been used, have certain advantages over natural rubber. For instance, they have greater resistance to oils and solvents, and in the case of the products from the nitriles and esters they also have greater resistance to abrasion.

Hitherto it has been impossible to obtain satisfactory bonded composite articles of the kind mentioned.

This invention has as an object to devise a method of bonding natural rubber to the above synthetic rubber-like materials. A further object is to produce composite rubber articles comprising vulcanised natural rubber bonded to the above synthetic rubber-like material. Further objects will appear hereinafter.

These objects are accomplished by the following invention.

We have now found that they can be obtained by arranging unvulcanised compounded natural rubber and unvulcanised compounded synthetic rubber-like material of the kind mentioned with unvulcanised compounded synthetic rubber-like material made by polymerising butadiene or a homologue of butadiene in between and in good contact, and then vulcanising.

As an example of a synthetic rubber-like material from butadiene or its homologues and ketones there may be mentioned that from butadiene and methyl methylene ethyl ketone, which is described in British Specification No. 349,976. Examples of similar materials from nitriles are those from butadiene and acrylonitrile, isoprene and acrylonitrile, and butadiene and methacrylonitrile, which are described in British Specification No. 360,821. Examples of similar materials from esters are those from butadiene and methyl acrylate, butadiene and n-butyl acrylate, and isoprene and n-butyl acrylate which are obtained as described in British Specification No. 360,822.

The following examples in which parts are by weight illustrate but do not limit the invention:

EXAMPLE 1

Three mixes are made as follows:

*Natural rubber mix*

| | Parts |
|---|---|
| Smoked sheet rubber | 100 |
| Zinc oxide | 5 |
| Carbon black | 40 |
| Stearic acid | 4 |
| Sulphur | 3 |
| Mercaptobenzthiazole | 0.75 |

*Interpolymerised butadiene synthetic rubber-like material mix*

| | Parts |
|---|---|
| Synthetic rubber-like material made by interpolymerising 65 parts of butadiene and 35 parts of acrylonitrile in acid emulsion | 100 |
| Zinc oxide | 10 |
| Carbon black | 50 |
| Stearic acid | 2 |
| Sulphur | 1 |
| Mercaptobenzthiazole | 1 |

*Bonding mix*

| | Parts |
|---|---|
| Synthetic rubber-like material made by polymerising 55 parts of isoprene in the presence of 2.5 parts of sodium wire at 60° C. for 12 days | 100 |
| Carbon black | 50 |
| Stearic acid | 4 |
| Mercaptobenzthiazole | 1 |
| Zinc oxide | 5 |
| Sulphur | 3.5 |

The first two mixes are sheeted, the surfaces to be bonded are wetted with benzene to make them tacky, the bonding mix in the form of a thin sheet is interposed and the composite layer then vulcanised in a press at 141° C. for 40 minutes.

The bonded layers cannot be torn apart except by tearing the intermediate layer in two.

The synthetic rubber-like material made by interpolymerising 67 parts of butadiene and 33 parts of methyl acrylate can be bonded to natural rubber in the same way as above.

Example 2

Three mixes are made as follows:

Natural rubber mix

| | Parts |
|---|---|
| Smoked sheet rubber | 100 |
| Zinc oxide | 51.5 |
| Mercaptobenzthiazole | 0.8 |
| Stearic acid | 0.3 |
| Pine tar | 2.5 |
| Sulphur | 2.5 |

Interpolymerised butadiene synthetic rubber-like material mix

| | Parts |
|---|---|
| Synthetic rubber-like material made by interpolmerising in acid emulsion a mixture of 72 parts of butadiene and 29 parts of methyl vinyl ketone | 100 |
| Carbon black | 50 |
| Stearic acid | 2 |
| Mercaptobenzthiazole | 1 |
| Zinc oxide | 10 |
| Sulphur | 2 |

Bonding mix

| | Parts |
|---|---|
| Synthetic rubber-like material made by polymerising 81 parts of butadiene with 4 parts of sodium wire for 5 days at 60° C | 100 |
| Carbon black | 50 |
| Stearic acid | 2 |
| Mercaptobenzthiazole | 1 |
| Zinc oxide | 10 |
| Sulphur | 1 |

Bonding is carried out as described in Example 1 and a similar good bond is obtained. Good bonds are obtained in the same manner between natural rubber and synthetic rubber-like materials made by interpolymerising mixtures of 80 parts of butadiene and 20 parts of methyl vinyl ketone and 50 parts of butadiene and 50 parts of methyl vinyl ketone.

Example 3

This is as Example 2, except that the synthetic rubber-like material used in the bonding mix is that made by emulsion polymerisation of butadiene in the presence of carbon tetrachloride at 60° C.

Example 4

This is as Example 2, except that the synthetic rubber-like material used in the bonding mix is that made by polymerising butadiene in aqueous emulsion containing hydrogen peroxide at 10–15° C.

The advantage of being able to make such composite articles will be readily apparent to those skilled in the art of fabricating rubber articles, since formed structures can be made in which some parts are composed of natural rubber and other parts are composed of the synthetic rubber-like material. Thus in the manufacture of motor car tyre covers, the inner portion of the cover may be made of natural rubber and the outer layer of the synthetic rubber-like material. The resulting tyre cover will have a greater resistance to abrasion and, consequently, a longer running life. It will have greater resistance to sun-checking and will also have greater resistance to oils and solvents and so be more immune from damage by accidental contact with these. Also in the manufacture of rubber rollers for printing, these can be made with an outer layer of the synthetic rubber-like material bonded to a core of natural rubber, so that the outer parts will have good resistance to the vehicles in the printing inks and to the machine oils with which they are liable to come into contact.

We claim:

1. A process for the manufacture of vulcanized composite rubber articles comprising natural rubber bonded to a synthetic rubber-like material made by interpolymerizing a mixture comprising a diolefine selected from the group consisting of butadiene and its homologues and a compound of the general formula

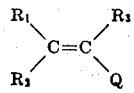

in which $R_1$, $R_2$, and $R_3$ are selected from the group consisting of hydrogen and alkyl radicals and in which Q is selected from the group consisting of

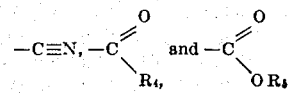

in which $R_4$ and $R_5$ are alkyl groups, which process comprises arranging the unvulcanized compounded natural rubber and the unvulcanized compounded synthetic rubber-like material with an unvulcanized compounded synthetic rubber-like polymer of a diolefine of the group consisting of butadiene and its homologues in between and in good contact, and then vulcanizing.

2. A process as described in claim 1, further characterized in that the interpolymer is formed from butadiene and a compound of the general formula, and in that the synthetic rubber-like polymer is a polymer of butadiene.

3. A process as described in claim 1, further characterized in that the interpolymer is formed from butadiene and acrylonitrile, and in that the synthetic rubber-like polymer is a polymer of isoprene.

4. A vulcanized composite rubber article comprising natural rubber and synthetic rubber-like material made by interpolymerizing a mixture comprising a diolefine selected from the group consisting of butadiene and its homologues and a compound of the general formula

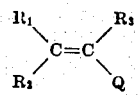

in which $R_1$, $R_2$, and $R_3$ are selected from the group consisting of hydrogen and alkyl radicals and in which Q is selected from the group consisting of

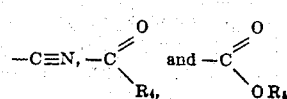

in which $R_4$ and $R_5$ are alkyl groups, and a bond of synthetic rubber-like polymer made by polymerizing a diolefine selected from the group consisting of butadiene and its homologues.

5. A product as described in claim 4, further characterized in that the interpolymer is formed from butadiene and a compound of the general formula, and in that the synthetic rubber-like polymer is a polymer of butadiene.

6. A product as described in claim 4, further characterized in that the interpolymer is formed from butadiene and acrylonitrile, and in that the synthetic rubber-like polymer is a polymer of isoprene.

7. A process for the manufacture of vulcanized composite rubber articles comprising natural rubber bonded to a synthetic rubber-like material made by interpolymerizing about 65 parts of butadiene with about 35 parts of methacrylonitrile while dispersed in an acid aqueous medium, which comprises wetting the surfaces to be bonded with benzene to make them tacky when brought together, and then arranging the unvulcanized compounded natural rubber and the unvulcanized compounded synthetic rubber-like material with, in between and in good contact, an unvulcanized compounded synthetic rubber-like polymer of butadiene made by polymerizing butadiene in the presence of sodium wire, and then vulcanizing.

8. A vulcanized composite rubber article comprising natural rubber and synthetic rubber-like material made by interpolymerizing about 65 parts of butadiene with about 35 parts of methacrylonitrile while dispersed in an acid aqueous medium, and a bond of synthetic rubber-like material made by polymerizing butadiene in the presence of sodium wire.

9. A process as described in claim 1, further characterized in that the interpolymer is formed from butadiene and an ester of the general formula, and in that the synthetic rubber-like polymer is a polymer of butadiene.

10. A process as described in claim 1, further characterized in that the interpolymer is formed from butadiene and a nitrile of the general formula, and in that the synthetic rubber-like polymer is a polymer of butadiene.

11. A product as described in claim 4, further characterized in that the interpolymer is formed from butadiene and an ester of the general formula, and in that the synthetic rubber-like polymer is a polymer of butadiene.

12. A product as described in claim 4, further characterized in that the interpolymer is formed from butadiene and a nitrile of the general formula, and in that the synthetic rubber-like polymer is a polymer of butadiene.

BERNARD JAMES HABGOOD.
LESLIE BUDWORTH MORGAN.